UNITED STATES PATENT OFFICE.

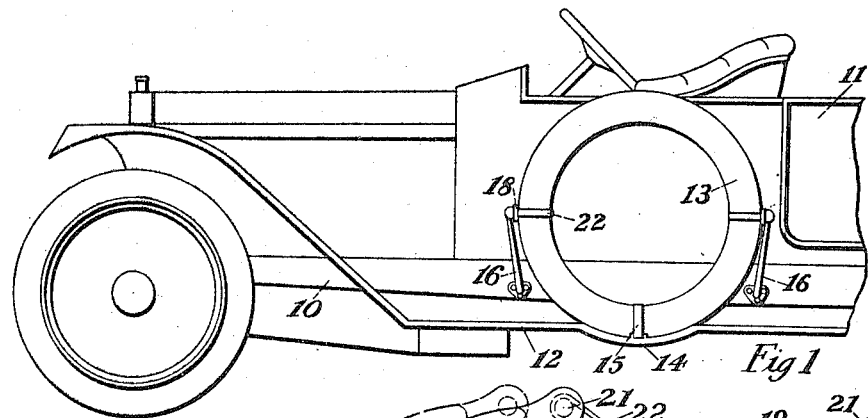

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,222,006.

Specification of Letters Patent.

Patented Apr. 10, 1917.

Application filed October 25, 1912. Serial No. 727,801.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which the following is a specification.

This invention relates to motor vehicles, and particularly to means for securing the spare tires thereon.

One of the objects of the invention is to provide a motor vehicle with tire securing means that is adjustable to take various sizes of tires.

Another object of the invention is to construct a tire securing device of simple and inexpensive form, and one that may have its parts adjustable to several tire holding positions.

Other objects of the invention will appear from the following description, taken in connection with the drawings, which form a part of this specification, and in which—

Figure 1 is a side elevation of a motor vehicle, showing the method of securing spare tires thereon;

Fig. 2 is an enlarged view of an adjustable tire securing means built according to this invention;

Fig. 3 is similar to Fig. 2, with the parts adjusted to a different position;

Fig. 4 is an end view of the tire securing means shown in Fig. 2; and

Figs. 5, 6 and 7 are detail views.

Most motor vehicles are built to take several different sizes of tires, depending upon the uses to which the vehicle may be put, or upon the wishes of the owner, and the present invention embodies a bracket for securing the spare tires that are usually carried upon the running board or at the rear end of the vehicle, which bracket is adapted to be adjusted to several positions for holding these various sizes of tires.

Some owners of motor vehicles prefer to have larger tires on the rear wheels than on the front, which necessitates carrying two spare tires of different sizes.

It will be understood that the spare tires above referred to are usually mounted upon demountable rims and are inflated, ready to replace a punctured or worn out tire. It will also be understood that in some cases demountable wheels are used, and of course the present invention applies as well to demountable wheels as to demountable rims, as it constitutes a means for supporting the inflated tire, regardless of whether the tire is on a rim only or on a complete wheel capable of replacing one of the other wheels of the vehicle.

In this application, the invention is shown as applied to tire securing means, where the tires are mounted on the running board of the vehicle, but it is equally applicable to tires supported at the rear of the vehicle.

Referring to the drawings, a motor vehicle frame is shown at 10, upon which is mounted a body 11 and a running board 12, a pair of spare tires 13 resting in a depression 14 of the running board and secured thereto by a strap 15. A pair of tire holding brackets 16 are suitably secured to the frame 10, as shown in Fig. 1, and extend upwardly about half way at either side of the tires 13. The upper ends of these brackets 16 are bent to form substantially horizontal trunnions 17, and upon these trunnions are mounted tire securing members 18, which have a curved band part 19 and a cylindrical boss 20 thereon. The band part 19 is provided with cast-in pins 21, around which the securing straps 22 may pass, for securing the tires 13 to the members 18.

It will be seen that the cylindrical boss 20 surrounds the trunnion 17, and is connected thereto by a bushing 23, shown in detail in Figs. 5, 6 and 7. This bushing is mounted so that it may be turned in the boss 20, and it may be secured in several adjusted positions therein by a bolt 24, which enters sockets 25 formed in the bushing 23.

The bushing 23 has a longitudinal bore 26, which is eccentric to the center of the bushing, as shown particularly in Figs. 5 and 7. This bore is also slightly diagonal, as shown in Fig. 6. The trunnion 17 fits the bore 26 snugly, and the bushing is secured on the trunnion by a nut 27, threaded on the end of the trunnion.

From the above description, it will be seen that the securing member 18 may be set in the position shown in full lines in Fig. 2, and if the opposite securing member is secured in the same position, a pair of comparatively small tires may be securely held between the supporting brackets without any play. If two tires of approximately a half inch larger diameter are intended to be used, one of the members 18 may be adjusted to the position shown in dotted lines in Fig. 2, by rotating the bushing 23 180° on the trunnion 17. This adjustment is made by loosening the bolt 24 and the nut 27, and turning the bushing on the trunnion. This throws the solid part of the eccentric bushing to the other side of the trunnion 17, and brings the member 18 closer to the trunnion.

If a pair of tires of somewhat larger size are to be secured between the members 18, both of the members may be adjusted close to the trunnion 17, as in Fig. 2.

If it is desired to secure one comparatively small and one large tire between the brackets 16, the bushing 23 may be adjusted to a middle position, or 90° from that shown in Figs. 2 and 4, and by reason of the bore 26 being diagonal to the axis of the bushing, the member 18 will be adjusted to the diagonal position shown in Fig. 3, which is in the same general plane as the positions shown in full and dotted lines respectively in Fig. 2. The tire contacting face 13$^a$ will have been moved closer to the center of the tires than the adjacent contacting face 13$^b$, and the tire brackets will then be in position to receive one small and one large tire, as shown in said Fig. 3.

Various modifications of the invention may be made without departing from the scope of this application.

Having thus described my invention, what I claim and desire to secure by Letters Patent, is,

1. A tire bracket comprising a supporting member having a trunnion, a tire holding member, and an eccentric piece connecting said tire holding member to said trunnion.

2. A tire bracket comprising a supporting member having a trunnion, a tire holding member having a cylindrical part surrounding said trunnion, and an eccentric bushing between said trunnion and said cylindrical part.

3. A tire bracket comprising a supporting member having a trunnion, a tire holding member having a cylindrical part surrounding said trunnion, and a bushing mounted eccentrically on said trunnion and supporting said tire holding member by said cylindrical part.

4. A tire bracket comprising a supporting member having a trunnion, a tire holding member, and an eccentric bushing connecting said members, said bushing being also mounted diagonally on said trunnion.

5. A tire bracket comprising a supporting member, a tire holding member thereon having two adjacent tire contacting faces for a pair of tires arranged side by side, and a connection between said supporting member and said tire holding member at the middle of the latter for adjusting said tire holding member to move one of said faces relatively closer to the center of the tires than the other.

6. A tire bracket comprising a supporting member having a trunnion, a tire holding member having a cylindrical part surrounding said trunnion, and an angularly mounted bushing between said trunnion and said cylindrical part.

7. A tire bracket comprising a supporting member having a trunnion, a bushing eccentrically mounted on said trunnion, and a tire holding member mounted on said bushing.

8. A tire bracket comprising a supporting member, a tire holding member, and means connecting said members and for adjusting said tire holding member to two different parallel positions and to a third angular position in the same general plane of said two parallel positions, for the purpose described.

9. A tire bracket comprising a supporting member, a tire holding member, and means connecting said members and for adjusting said tire holding member toward one side of said supporting member for small tires, toward the other side of said supporting member for larger tires, and to an intermediate position and at a slight angle to the supporting members for one large and one small tire.

10. A tire securing means comprising a pair of separated brackets, tire holding devices on said brackets arranged to coöperate to hold a tire between them, and means for adjusting said tire holding devices toward and from each other and to an angular position in the same general plane.

11. In a motor vehicle, the combination with the bottom support for tires, of a pair of separated brackets supported by the vehicle and extending above and at either side of said bottom support, tire holding devices on said brackets, means for adjusting said tire holding devices toward and from each other and to positions at an angle to each other in a horizontal plane to take various sizes of tires between them, and means for securing the tires to said devices.

12. In a motor vehicle, the combination with the bottom support for tires, of a pair of separated brackets supported by the vehicle and extending above and at either side of said bottom support, tire holding devices on said brackets, means for adjusting said tire holding devices each to three different positions, first, to hold two small tires snugly between them, second, to hold two larger tires snugly between them, and, third, to hold one small and one larger tire snugly between them, and means for securing the tires to said devices.

13. A tire bracket comprising a supporting member, a tire holding member thereon having two adjacent tire contacting faces for a pair of tires arranged side by side, and a connection between said supporting member and said tire holding member between the tire contacting faces for adjusting said tire holding member to move one of said faces relatively closer to the center of the tires than the other.

In testimony whereof I affix my signature in the presence of two witnesses.

ALLEN LOOMIS.

Witnesses:
 ALFRED H. KNIGHT,
 JOHN D. WILSON.

Copies of this patent may be obtained for five cents each, by addressing the "Commissioner of Patents, Washington, D. C."